Aug. 12, 1930.        M. D. JEFFRIES        1,772,489
HOLDER FOR CONES, SO CALLED, OR OTHER CONTAINERS OF VARIOUS TYPES

Filed July 25, 1929

Mack D. Jeffries Inventor

By *Chandler W. Dorett*

Attorney

Patented Aug. 12, 1930

1,772,489

UNITED STATES PATENT OFFICE

MACK D. JEFFRIES, OF BOSTON, MASSACHUSETTS, ASSIGNOR, BY MESNE ASSIGNMENTS, OF ONE-HALF TO EMELIE F. SINGER, OF NEWTON HIGHLANDS, MASSACHUSETTS

HOLDER FOR CONES, SO CALLED, OR OTHER CONTAINERS OF VARIOUS TYPES

Application filed July 25, 1929. Serial No. 380,915.

This invention relates to holders for cones, so called, or other containers of various types, whether cylindrical, round, sandwich shape, or otherwise, generally of the edible type, such as are used at refreshment stands for dispensing ice cream, and is adaptable for holding such containers while they are being filled, all of which containers are hereinafter for convenience referred to as containers.

It has for its objects to provide a more sanitary method of filling containers than heretofore available; to provide container centering means; to avoid container breakage; to minimize the expense of handling; to save time; to provide an accurate and uniform measure; to provide improved and effective opening, closing, and locking means; and to provide the various other advantages and results made evident from the following specification.

I accomplished the objects of my invention by providing a holding member shaped to receive the particular type of container used, having container centering means therein, and adaptable to open for the purpose of receiving the container and to close on and about said container after the same has been positioned in said centering means within the holding member. The average commercial container is of brittle composition, susceptible to breakage, and this device is particularly designed to give that precise and careful handling resulting in a minimum of such breakage.

Figure 1:
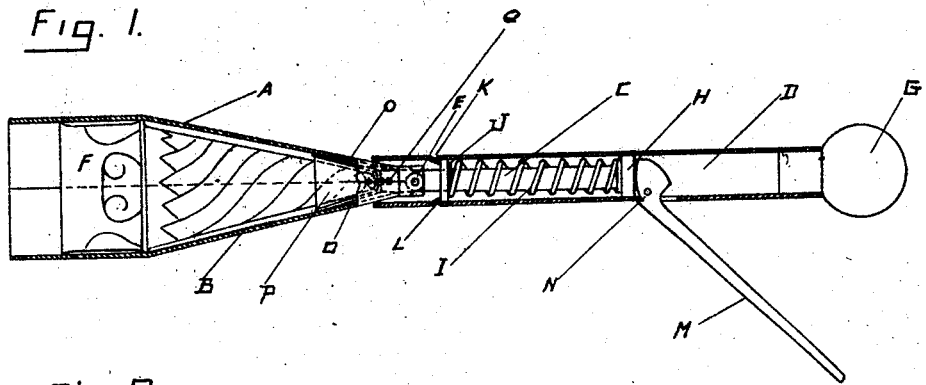
Figure 2:
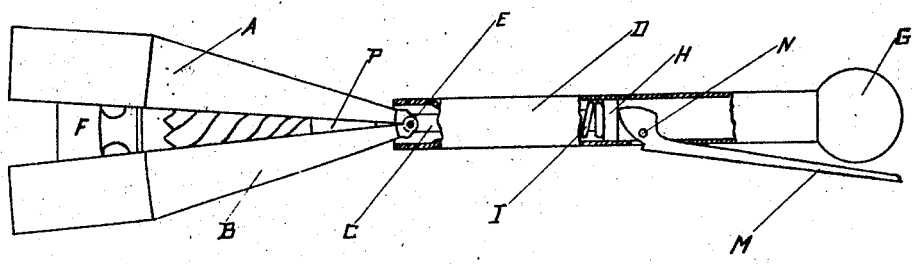
Figure 3:
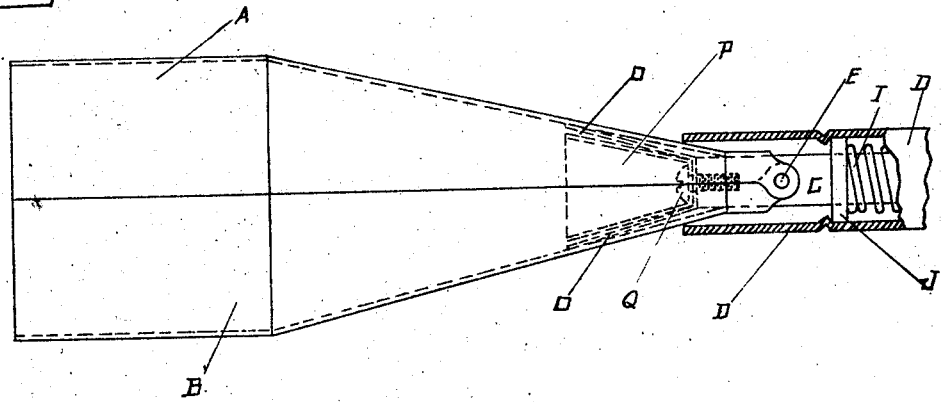

Referring to the accompanying drawings, which illustrate one complete example of the embodiment of the invention as applied to cones, constructed according to the best modes I have so far devised for the practical application of the principle, which form a part of this specification, and in which similar letters of reference refer to similar parts throughout the several views, Figure 1 is a sectional view of my device in closed position with a cone therein, and showing the inner working mechanism. Figure 2 is a side view showing the device in open position with a cone therein, portions of the handle being cut away to show the position of the inner parts in such closed position. Figure 3 is an enlarged sectional view of the cone holding member, the cone centering means, which comprises a fixed, inner, container receiver, shaped to receive, fit and center the closed end of the particular container used, and the end of the handle within which said holding member fits.

Referring again to Figures 1, 2 and 3, A and B show the respective sides of the cone holding member, said sides being hinged at their small ends to the plunger rod C within the hollow handle D by the pin E, which pin E passes through openings in said ends and through a correspondingly sized opening in said rod C which registers therewith. F shows the cone within said holding member. G shows the terminal knob on the handle D for convenience in exerting pressure as the device is inserted in the ice cream or other substance for filling, the degree or quantity of the fill being regulated by the degree of pressure exerted on the knob G. H shows a head on the plunger rod C which head acts as a terminal for one end of the spring I, the opposite end of which presses against the washer J, which washer is held in the position shown by the handle indentations K and L. The lever M mounted at N and bearing against the head H furnishes means for compressing the spring I, and in turn forcing the ends A and B of the holding member out of the hollow handle. The lever spring O is mounted on one end of the plunger rod C, under the centering means P, which in this particular embodiment is cone shaped to receive, fit, and center the closed end of the cone container pictured, both of which are held in position on said rod by the screw Q.

In operation, as the handle D is grasped with the hand and the lever M pressed by the thumb or otherwise, so as to force the head H in the direction of the cone holding member, the spring I is compressed and the ends of the sides A and B are forced out of the hollow handle. The spring O thereupon exerting its pressure outwardly against the sides A and B causes them to open to the position shown in Figure 2. The cone F is then inserted in the centering means P as shown in Figure 2. Pressure on the lever M is then released and the spring I thereupon draws the ends A and B into the hollow handle D thus closing the sides A and B about the cone F as shown in Figure 1. The device is then ready for filling after which a slight pressure on the lever M again opens the sides A and B and releases the filled cone for delivery to the customer.

The device as pictured is readily adapted to containers of various forms by shaping the holding member and centering means to fit the particular type of container used.

While I have illustrated and described a preferred construction for carrying my invention into effect, this is capable of variation or modification without departing from the spirit of the invention. I therefore do not wish to be limited to the exact details of construction herein set forth but desire to avail myself of such variations and modifications as come within the scope of the appended claims.

Having thus described my invention, I claim as new and desire to secure by Letters Patent of the United States of America:

1. In a device of the kind described, a container holding member having a cutting edge, container centering means within said holding member, a handle adaptable for use in inserting the container holding member into a given substance, and means for opening, closing, and locking said holder member in closed position, said means comprising a spring member mounted to exert an outward pressure against the sides of the holding member, a spring within said handle adaptable to over-come the pressure of said first spring and draw the side ends of said holding member into said handle so as to close said holding member, and leverage means to control the normal tension of last said spring and force said side ends out of said handle and allow said first spring to open the sides of said holding member, all substantially as described.

2. In a device of the kind described the combination of a hollow handle a container holding member comprising sides adaptable to open and close upon a container placed therein, its side ends slidably mounted in said hollow handle, container centering means within said holding member, a spring mounted to exert its force against the sides of said holding member so as to open said sides, a second spring so mounted within said handle as to draw said ends into said handle and thereby close said holding member, and leverage means to overcome the normal tension of last said spring to force said ends out of said handle and allow said first spring to open the sides of said holding member, all substantially as described.

3. In a device of the kind described the combination of a hollow handle, a container holding member comprising sides adaptable to open and close upon a container placed therein, its side ends slidably mounted in said hollow handle, container centering means within said holding member, a spring mounted to exert its force against the sides of said holding member so as to open said sides, a second spring so mounted within said handle as to draw said ends into said handle and thereby close said holding member, and leverage means to overcome the normal tension of last said spring to force said ends out of said handle and allow said first spring to open the sides of said holding member, all substantially as described.

4. A device of the character described comprising a hollow handle, an abutment therein, a rod having an abutment, a spring between said abutments, a receptacle composed of a pair of sections pivoted to said rod, a spring tending constantly to swing said sections apart, said first mentioned spring serving to retract portions of said sections into said handle to maintain the sections normally closed, and a lever pivoted to the handle for cooperation with said rod to project the sections from the handle to permit said second mentioned spring to swing the sections apart.

5. In a device of the character described, a rod, a pair of receptacle sections pivoted to said rod for swinging movement to open and closed positions, a cup-like container centering member carried by said rod and disposed between said receptacle sections, spring means disposed between said cup-like member and said receptacle sections tending constantly to open the latter, and means cooperating with said rod and said sections to maintain the latter normally closed.

6. A device of the character described comprising a hollow handle, a receptacle composed of a plurality of sections movable to open and closed positions with respect to one another, means constantly tending to retract portions of said sections into said handle to maintain them normally in a closed position with respect to one another, means operable to open said sections when same are projected from said handle, and a lever pivoted to the handle and extending normally outward with respect thereto and adapted by swinging movement towards the handle to cooperate with said receptacle sections to project the latter from the handle.

7. In a device of the character described, a receptacle composed of a plurality of sections connected together for movement to open and closed positions with respect to one another, a substantially U-shaped spring disposed within said receptacle and inclusive of arms cooperating with said receptacle sections to urge them constantly to an open position with respect to one another, means overcoming said spring and tending constantly to maintain said sections closed, and a manually operable device to overcome said means to permit said spring to function to open said sections.

8. In a device of the character described, a receptacle composed of a plurality of sections connected together for movement to open and closed positions with respect to one another, a substantially U-shaped spring disposed within said receptacle and inclusive of arms cooperating with said receptacle sections to urge them constantly to an open position with respect to one another, means overcoming said spring and tending constantly to maintain said sections closed, a manually operable device to overcome said means to permit said spring to function to open said sections, and a cup-like container centering member disposed within said receptacle and serving as a shield to prevent a container placed within the receptacle from contacting with said spring.

In testimony whereof I affix my signature.

MACK D. JEFFRIES.